March 15, 1960 H. D. JAMES 2,929,009
MOTOR CONTROL SYSTEMS
Filed June 21, 1951 11 Sheets-Sheet 1

Inventor
HENRY D. JAMES
By William J. Ruano
Attorney

March 15, 1960

H. D. JAMES 2,929,009

MOTOR CONTROL SYSTEMS

Filed June 21, 1951

Inventor
HENRY D. JAMES
By William J. Ruano
Attorney

March 15, 1960 H. D. JAMES 2,929,009
MOTOR CONTROL SYSTEMS
Filed June 21, 1951 11 Sheets-Sheet 4

Inventor
HENRY D. JAMES
By William J. Ruano
Attorney

March 15, 1960 H. D. JAMES 2,929,009
MOTOR CONTROL SYSTEMS
Filed June 21, 1951 11 Sheets-Sheet 5

Fig. 8.

Inventor
HENRY D. JAMES
By
William J. Ruano
Attorney

March 15, 1960  H. D. JAMES  2,929,009
MOTOR CONTROL SYSTEMS
Filed June 21, 1951  11 Sheets-Sheet 6

Inventor
HENRY D. JAMES
By
William J. Ruano
Attorney

March 15, 1960 H. D. JAMES 2,929,009
MOTOR CONTROL SYSTEMS
Filed June 21, 1951 11 Sheets-Sheet 7

Inventor
HENRY D. JAMES
By
William J. Ruano
Attorney

March 15, 1960 H. D. JAMES 2,929,009
MOTOR CONTROL SYSTEMS
Filed June 21, 1951 11 Sheets-Sheet 9

Inventor
HENRY D. JAMES
By William J. Ruano
Attorney

March 15, 1960     H. D. JAMES     2,929,009
MOTOR CONTROL SYSTEMS
Filed June 21, 1951     11 Sheets-Sheet 11

Inventor
HENRY D. JAMES
By
Attorney

United States Patent Office 2,929,009
Patented Mar. 15, 1960

2,929,009

MOTOR CONTROL SYSTEMS

Henry D. James, Pittsburgh, Pa., assignor of twenty-five percent to William J. Ruano, Pittsburgh, Pa.

Application June 21, 1951, Serial No. 232,687

5 Claims. (Cl. 318—327)

The present invention relates to improvements in motor control systems and, more particularly, to systems for controlling the load or speed, or both, of an electric motor.

Systems commonly used for controlling electric motors generally employ electronic tubes and rotating dynamo electric machines which require continuing maintenance. Frequent replacement of parts, particularly electronic tubes, is required, which makes the systems somewhat undesirable, particularly when subjected to vibration and other disturbances. While certain control systems have been employed which use magnetic amplifiers, also referred to as saturable core reactors, these have been rather complicated. For example, magnetic amplifiers have been used in variable voltage systems, which systems involve not only considerable cost because of the large number of component parts thereof, but which require a high degree of technical skill for upkeep and repair, which is usually beyond the capabilities of the average electrical repairman.

An object of the present invention is to provide novel control systems employing magnetic amplifiers, which systems are devoid of the above named disadvantages and which afford optimum and maximum utilization of many heretofore unrecognized and highly desirable characteristics of magnetic amplifiers.

A more specific object of the present invention is to provide novel control means employing magnetic amplifiers for controlling the load or speed, or both, of an electric motor, which control means involve simple control circuits that are rugged and have a minimum number of parts that are easy for a workman to understand and maintain, and which circuits are devoid of electronic tubes and moving parts.

Other objects and advantages of the present invention will become apparent from a study of the following description taken with the accompanying drawings wherein:

A magnetic amplifier, sometimes referred to as a saturable core reactor, is a special type of transformer generally having two sets of windings, the main or power windings energized by alternating current and the control windings energized by direct current. One of the elementary types of magnetic amplifiers is the three legged type consisting of a magnetic core having a pair of power windings wound on the outer legs energized by alternating current and a control winding on the central leg energized by direct current. The alternating current windings or coils on the outer legs are connected either in series or in parallel so that the alternating current flux passes through the outside iron core path but not through the center leg which carries the direct current coil. The direct current coil on the center leg sets up a saturating flux in the outside legs. Thus by increasing the control current in the direct current coil, the ampere turns on the center leg are increased, raising the degree of saturation and lowering the effective permeability of the outer legs. Consequently, the reactance of the A.C. coils is reduced, decreasing the total impedance in the A.C. current, hence increasing the load current and voltage. The iron core is operated close to its saturation point to make it sensitive to control. As stated above, the current flowing through the A.C. windings is controlled by the magnetism in the iron core—the greater the saturation in this core, the less the impedance of the A.C. circuit and the higher the current in the main or power windings, that is, more control current causes current saturation of the iron core which, in turn, causes greater current flow through the main or A.C. windings. A small change in D.C. control current can cause a very large change in A.C. current when the core is operated close to the saturation point.

Motor control systems are generally directed to the control of load or speed of the motor or both. This may be obtained with adjustable resistors inserted in the armature or field circuit of a direct current motor or a resistor in the secondary circuit of a wound rotor induction motor. When a direct current working motor is served by an individual generator with its own exciter, the motor can have its load or speed or both adjusted by controlling the field of the exciter. In many applications, the magnetic amplifier can control load, speed, voltage, etc., by a plurality of control windings, properly connected to the wiring system.

In accordance with the present invention, magnetic amplifiers are embodied and connected in various control systems in such a way as to make maximum utilization of some of the lesser known and heretofore unused characteristics of magnetic amplifiers and by making the control systems extremely simple and accurate, embodying a minimum number of parts to reduce cost and permit elementary understanding and maintenance of the circuit by an ordinary mechanic rather than requiring a highly skilled electrical serviceman.

Figure 1:
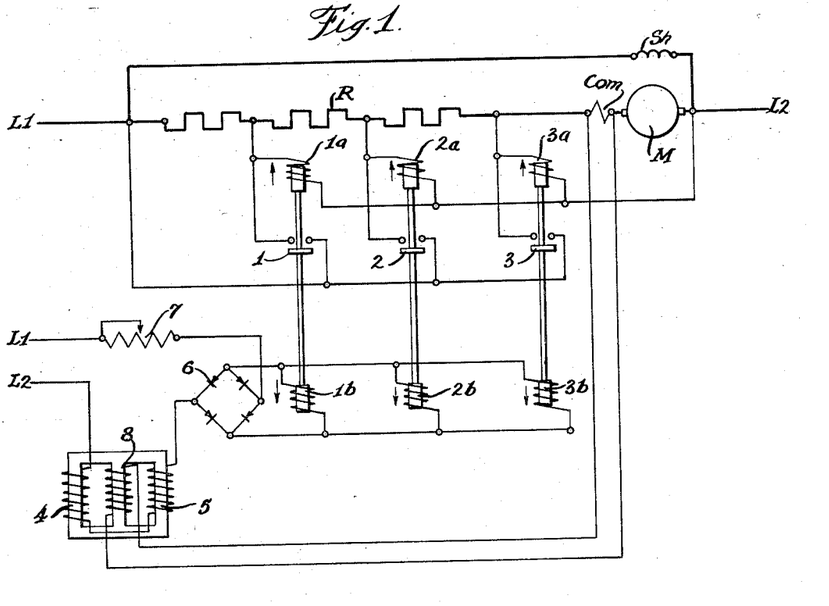
Fig. 1 is a schematic wiring diagram of a control system with a magnetic amplifier control embodying the principles of the present invention and for providing current limit acceleration of a direct current (shunt) motor.

Referring more particularly to Fig. 1 of the drawing which shows a control system for current limit acceleration of a direct current motor, M denotes the armature and Sh denotes the shunt field winding of a direct current shunt motor. A series or compound wound motor may be substituted for this shunt motor if desired. A resistor R is connected in series with the armature and with a commutating field winding Com. The line terminals L1 and L2 are connected through switching means of any well known type (not shown) to a source of direct current potential. When lines L1, L2 are energized by connection to such source, current will flow through the starting resistor R, the commutating field winding Com and armature M of the motor. At the same time, a current will flow through a shunt path through the shunt field winding Sh. The motor will thus start from rest and increase in speed, thus increasing the counter electromotive force and reducing the armature current, also reducing the voltage drop through the resistor. This increases the voltage on coil 1a of contactor 1. It will be noted that contactors 1, 2 and 3 are for the purpose of shunting successive portions of resistor R and are closed when sufficient voltage is applied to coils 1a, 2a and 3a, respectively. Opposing the action of coils 1a, 2a and 3a are lock out (differential) coils 1b, 2b and 3b, respectively, which are energized by direct current which is obtained by passing the line alternating current through the A.C. or power coils 4 and 5 of the magnetic amplifier, thence through a (bridge type) rectifier 6 which may be of the dry, copper oxide type, which current is adjusted by a variable resistor 7. The control or D.C. coil 8 wound around the center leg of the iron core of the magnetic amplifier has terminals which are connected across the terminals of the commutating field winding Com. Coil 1a is opposed by coil 1b which receives direct current through the magnetic amplifier and rectifier 6 proportional to the voltage drop across the commutating field. Likewise, coil 2a is opposed by coil 2b and coil 3a is opposed by coil 3b. As the motor speed increases, which increases the back electromotive force, the voltage drop through the resistor R and commutating field winding Com decreases, thereby decreasing the current in control coil 8 and, in turn, the current in power coils 4 and 5 of the magnetic amplifier which decreases the energization of the coil 1b while at the same time, the voltage on coil 1a increases sufficiently to effect closing of contactor 1. This short-circuits a section of the starting resistor R and increases the voltage on coil 2a. By virtue of the increased flow of current due to short-circuiting of a portion of the resistor R by contactor 1, there will be an increase in current flow through the coil 2b until the motor accelerates further in speed. Such acceleration causes greater counter E.M.F. and a decrease in energization of coil 2b while at the same time, coil 2a increases in strength until contactor 2 closes short-circuiting a larger section of the resistor R, which causes greater current flow through the armature and an increase in voltage of upper coil 3a which eventually closes contactor 3 and increases the armature current. As the motor speeds up further, its counter E.M.F. increases, and the armature current decreases so that reduced IR drop through the commutating field as measured and amplified by the magnetic amplifier will effect weakening of coil 3b while coil 3a increases in strength until contactor 3 closes, thereby completely short-circuiting resistor R, thus applying full line voltage to the armature and commutating field bringing the motor to full speed operation.

Figure 2:
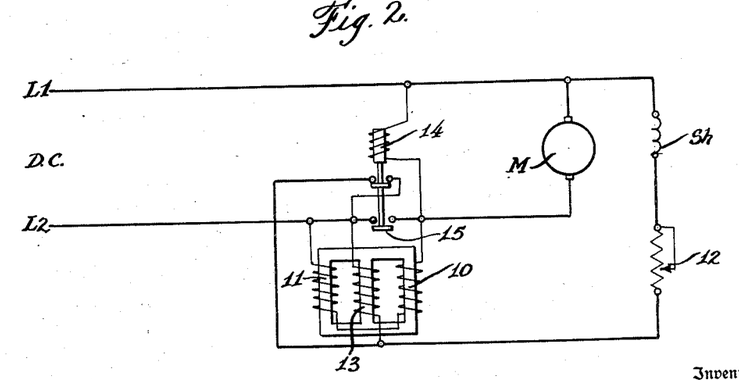
Fig. 2 shows a control system for a D.C. motor wherein a magnetic amplifier is used to provide induction starting of the motor.

Fig. 2 shows an induction starter for a D.C. motor. When line terminals L1, L2 are energized by a suitable source of direct current, a circuit will be completed through the armature M of the direct current motor which is connected in series with the outer coils 10 and 11 of a magnetic amplifier. A shunt circuit will be completed through the shunt field coil Sh, variable resistor 12, and the central or control coil 13 of the magnetic amplifier. The field current will build up slowly due to the impedance of the field coil Sh and control coil 13. The power coils 10 and 11 or the magnetic amplifier provide a high impedance which retards the current flow in the armature circuit of the motor. As the field current increases the magnetic amplifier impedance decreases and increases the voltage applied to the motor armature as well as the speed of the motor. When the motor approaches full speed, its counter E.M.F. builds up to energize relay coil 14 sufficiently to cause closing of contactor 15 which short-circuits all the coils of the magnetic amplifier, thus causing the application of full line voltage to the motor armature as well as full voltage across the shunt field winding Sh and resistor 12.

Figure 3:
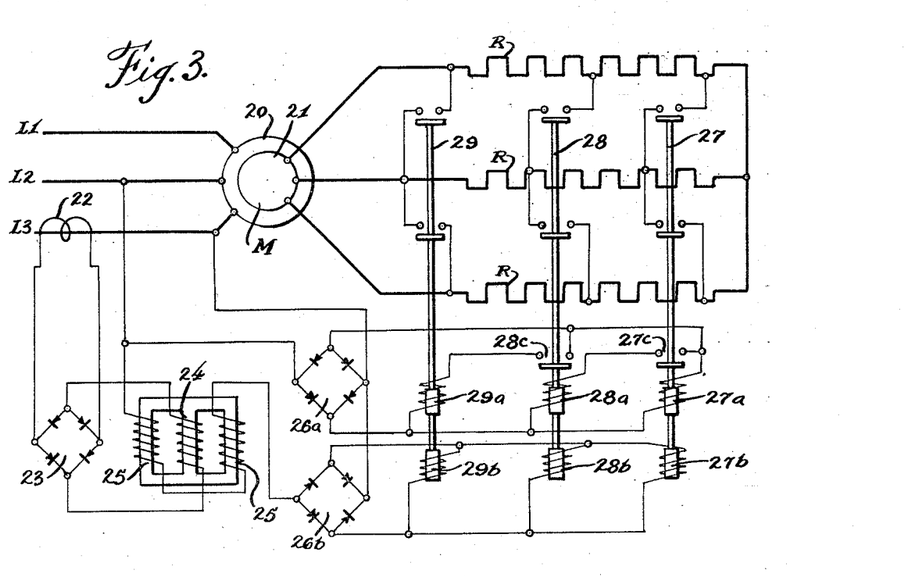
Fig. 3 shows a control system with magnetic amplifier control for current limit acceleration of an alternating current wound rotor motor.

Fig. 3 shows a current limit accelerator for an A.C. motor of the wound rotor type. When a suitable three-phase source of alternating current is applied to line terminals L1, L2 and L3, current will pass through the primary winding 20 of an A.C. motor M and induce a current in the secondary winding 21. The secondary winding or wound rotor 21 thereof is connected to a three-phase resistor R for limiting the current in-rush when starting. One of the line terminals L3 is electromagnetically coupled to a coil 22 of a series transformer which provides alternating current which, in turn, is rectified by copper oxide rectifier 23, thereby providing direct current to the control coil 24 of the magnetic amplifier. The power coils 25 of the magnetic amplifier are energized by one of the phases of the alternating current source by having one terminal connected to line terminal L2 and the other to a rectifier 26b, thence to line terminal L3. The wound rotor or motor secondary is short-circuited in steps by contactors 27, 28 and 29. These contactors are closed by the correspondingly identified relay closing coils 27a, 28a and 29a connected across one phase of the supply voltage through a rectifier 26a. The closing of the respective contactors is opposed by lock out coils 27b, 28b and 29b, respectively, receiving voltage in proportion to the load on the motor primary circuit as measured by the series transformer through a rectifier 26b. As the motor increases in speed, the current in the primary circuit decreases, reducing the current flow through the series transformer coil 22, thereby reducing the strength of the lock-out coil 27b, thereby permitting the energized coil 27a to close its corresponding contactor 27. This closes the interlock contact 27c in circuit with closing coil 28a. The closing of contactor 27 causes an increase in current through current transformer coil 22 so that the lock-out coil 28b on contactor 28 which receives increased voltage prevents closing of contactor 28 until the current is again decreased to a predetermined value. When contactor 28 closes, it closes the interlock contact 28c in series with the closing coil 29a which is again held out by its lock-out coil until the current drops to a predetermined value. Finally contactor 29 closes, fully short-circuiting all three phases of resistor R.

Figure 4:
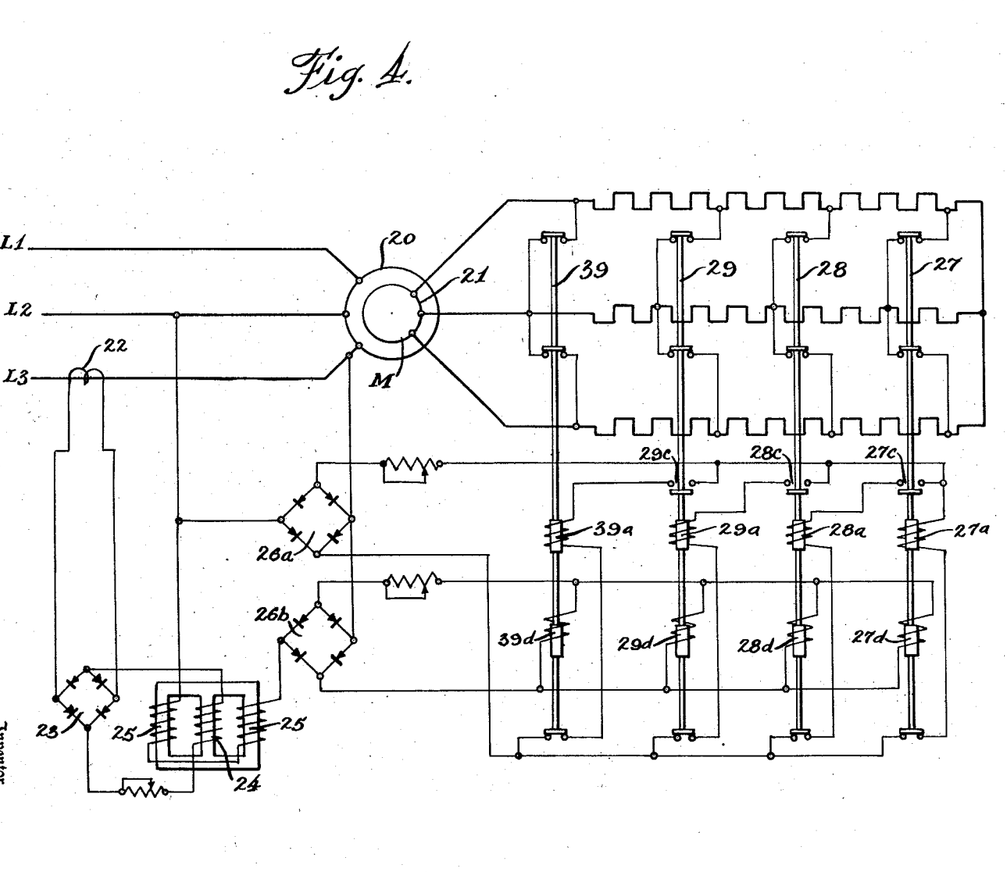
Fig. 4 shows a magnetic amplifier type of slip regulator for controlling an alternating current motor which drives a fly-wheel, which control system equalizes the power demand.

Fig. 4 shows a magnetic amplifier type of slip regulator, most of the circuit of which is identical to that shown in Fig. 3, therefore corresponding parts are identified by the same numerals. An additional contactor 39 is provided. The operation of this circuit is the same as that described in connection with Fig. 3 except that slip relays 39d, 29d, 28d and 27d are used in place of the lock-out coils. The motor drives a fly wheel (not shown). Assume that the motor has been accelerated to full speed in the same manner as described in connection with Fig. 3 and that a short time overload is imposed on the motor. This will increase the current flow through the series transformer 22, which causes slip relay coil 39d to become energized and lift contactor 39 opening its contact and inserting resistance in the motor secondary. If the load continues to increase, contactors 29, 28 and 27 are opened. The purpose of inserting this resistance is to slow down the motor and allow its fly-wheel to take part of the load. When the load decreases again, these contactors 27, 28, 29 and 39 close in the proper order accelerating the motor to full speed and storing energy in the fly-wheel to be used later when another overload occurs.

Figure 5:
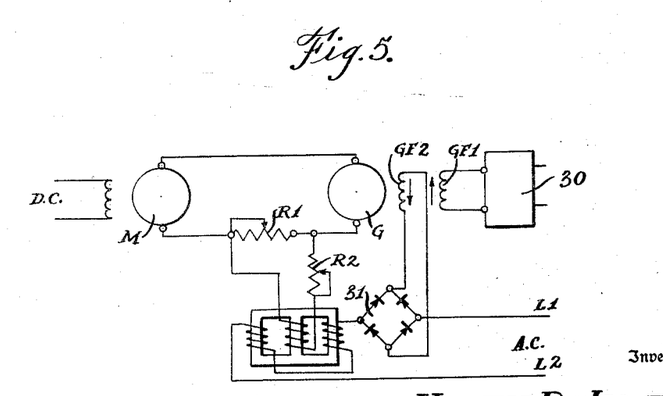
Fig. 5 shows a motor control system wherein a magnetic amplifier is used as a load regulator.

Fig. 5 is a diagram of a magnetic amplifier used as a load regulator. Motor M receives power from a generator G having two field coils GF1 and GF2. Field coil GF1 is controlled manually by the operator through a variable resistor or controller indicated by block diagram 30. It increases the voltage of generator G to increase the speed of motor M. The other generator field coil GF2 is a control field and opposes coil GF1. Field coil GF2 prevents the voltage of the generator from being increased too fast. Field coil GF2 is controlled by resistor R1 in the circuit between the motor and generator. The voltage drop across resistor R1 causes current to flow through the center coil of the magnetic amplifier and through variable resistor R2. Field coil GF2 receives its power from rectifier 31 energized by an A.C. source. The direct current output of this rectifier is proportional to the current flowing through the two outside coils of the magnetic amplifier. As the current in the center coil of the magnetic amplifier increases due to an increase in the voltage drop across the resistor R1, this increased current causes a proportional increase in the current through the two outside coils of the amplifier. This, in turn, increases the current flow through the generator field coil GF2 which opposes field coil GF1 and reduces the excitation of the generator to reduce the current flow through resistor R1. A decrease in current through resistor R1 causes a decrease in the current through the center coil of the amplifier which, in turn, reduces the current through generator field coil GF2 and permits the generator voltage to increase.

Figure 6:
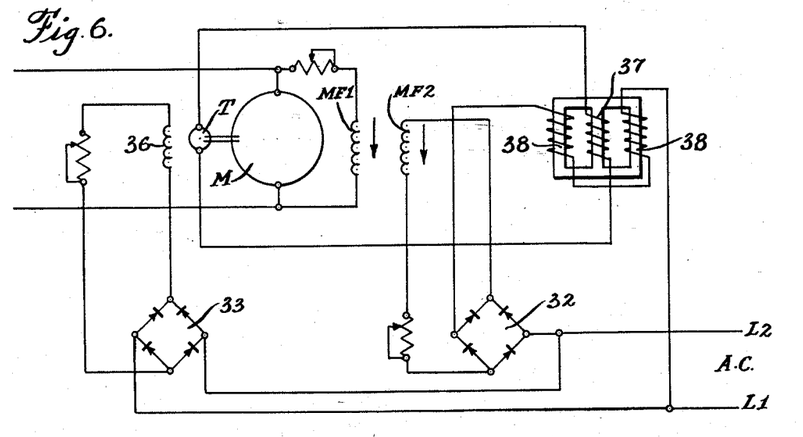
Fig. 6 shows a motor control system wherein a magnetic amplifier is used for regulating speed as measured by a tachometer generator.

The purpose of the control system shown in Fig. 6 is to maintain the speed of motor M constant. Motor M drives a tachometer generator T which is energized by field coil 36, which is fed by rectified current furnished by rectifier 33. This tachometer generator furnishes power to the center or control coil 37 of the magnetic amplifier. The outer or power coils 38 of this amplifier are connected through a rectifier 32 across the A.C. power service. The rectifier furnishes direct current to field coil MF2 of the motor. When the motor speed is greater than normal, the tachometer generator T sends increased current through the center coil 37 of the magnetic amplifier. This causes more current to flow through the outer coils 38 of the amplifier, also greater current flow through the rectifier 32 and field coil MF2. This, in turn, strengthens the field of the motor to reduce its speed to normal. If motor M runs below normal speed, tachometer T reduces its current flow through the center coil of the amplifier which, in turn, reduces the current through the motor field coil MF2. This reduces the strength of the motor field and increases the motor speed to normal.

Figure 7:
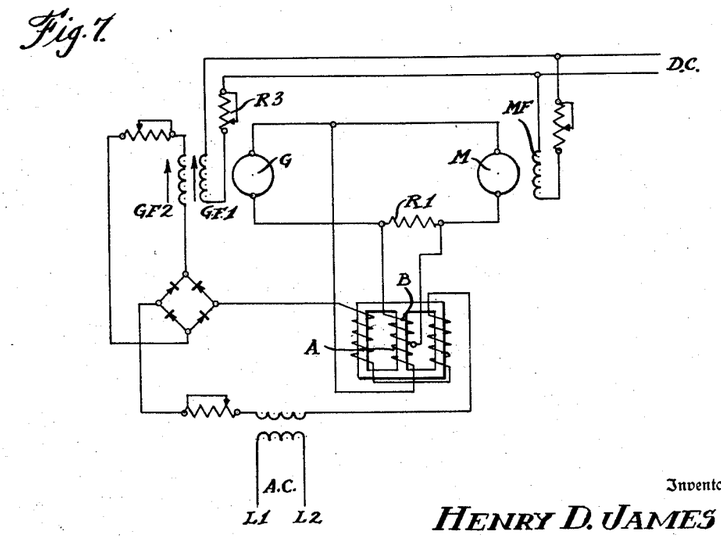
Fig. 7 shows a skip hoist control system using a magnetic amplifier.

Figure 7 is a diagrammatic showing of a skip hoist controller. The hoist motor M receives its power from an individual generator G. The generator has two field windings GF1 and GF2. Under normal operation, field winding GF1 is varied by resistor R3 to change the hoist motor speed. The purpose of field winding GF2 is to regulate the load in the motor generator circuit. This load is indicated by resistor R1. Control coil B of the magnetic amplifier is connected across the terminals of resistor R1 and measures the current in the circuit. Control coil A of the amplifier is connected across the terminals of the motor and measures the speed of the motor. The field winding MF of motor M remains constant. Control coils A and B on the center leg of the amplifier oppose each other when the motor load is positive so that an increase in current representing an increase in load reduces the ampere turns on the center leg of the amplifier which, in turn, reduces the current through the outer coils of the amplifier and therefore reduces the current through field winding GF2 of the generator reducing the generator voltage which, in turn, reduces the motor current. As the current through resistor R1 decreases below normal, coil B which opposes coil A decreases in strength, allowing more current to flow through the outer coils of the amplifier which increases the strength of field winding GF2 of the generator and increases the generator voltage to restore the load current to normal. When the motor load is negative, control coils A and B add together to further reduce the generator voltage to permit motor M to return power to the line without increasing its speed.

Figure 8:
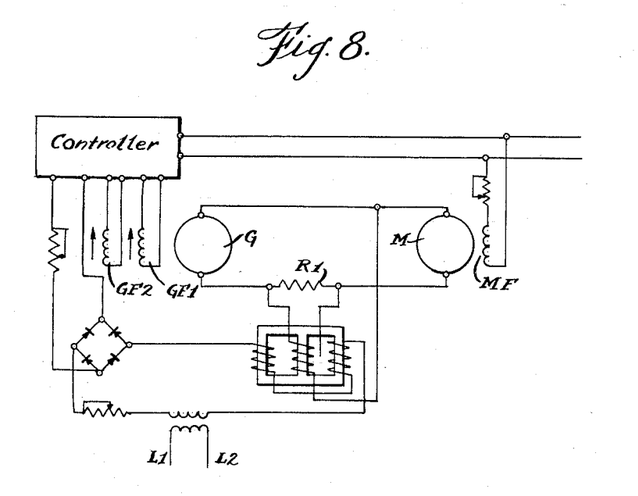
Fig. 8 shows a skip hoist control system somewhat similar to that shown in Fig. 7 but with an additional generator field control winding.

Figure 8 shows substantially the same skip hoist controller illustrated in Figure 7 with the addition of a rectangular symbol marked "controller." This controller is for the purpose of adjusting the field windings GF1 and GF2 of the generator so that the normal load and speed of the motor M can be changed at will and also reversed.

Figures 9, 10:
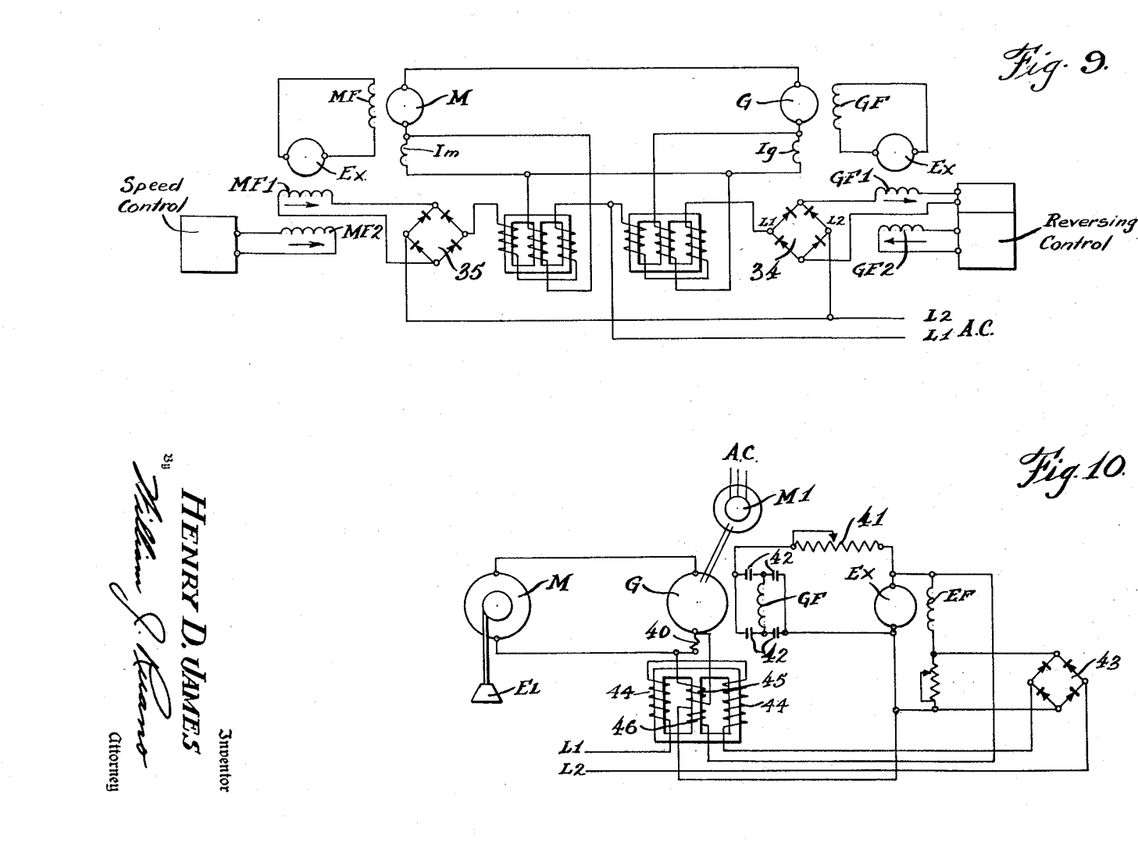
Fig. 9 shows a blooming mill control system employing a magnetic amplifier.
Fig. 10 shows a speed control system for elevators and mine and skip hoists.

Figure 9 shows a blooming mill control system. Generator G furnishes power to motor M which operates the blooming mill (not shown). Each machine has its own separate exciter EX energizing the motor and generator field windings MF and GF, respectively. The purpose of the control is to maintain constant load on motor M which is measured by the current through the interpole windings $I_g$ and $I_m$ of the generator and the motor, respectively. The motor is started from rest and accelerated to about 100 r.p.m. by increasing the strength of generator field GF. If this field is increased too fast, it causes an excessive current to flow between the generator and the motor. This causes an increased voltage drop across the interpole winding $I_g$ of the generator and through the center or control coil of the corresponding magnetic amplifier. This increased current permits an increased current to flow through the outer or power coils of such magnetic amplifier and through the rectifier 34 which increases the current in the generator field GF1. This field winding opposes field winding GF2 and reduces the voltage of generator G which, in turn, reduces the current to normal. If the current is below normal, the current in field winding GF1 is decreased, which increases the excitation of generator G and increases the current flow to the motor.

When the motor M reaches about 100 r.p.m., it is accelerated to 150 r.p.m. by decreasing the field strength of its winding MF2. If the decrease in field strength is too rapid, it causes an excess current to flow through the center coil of the corresponding magnetic amplifier which is connected across the interpole winding $I_m$ of the motor. This increases the current through the outer coils of the last mentioned amplifier and through the rectifier 35 to increase the strength of motor field winding MF1. This slows down motor M and brings the load back to normal.

If the load is less than normal, the center coil on the amplifier associated with the motor is reduced in strength, which reduces the motor control field MF1 which, in turn, reduces the field strength of the motor M and causes the motor to increase in speed to bring the load back to normal.

Figure 10 shows a speed control system for elevators as well as mine and skip hoists. The control system is such that it is readily adaptable as an addition to existing installations so as to readily convert them for control by a magnetic amplifier. A motor M which drives an elevator EL (or a mine or skip hoist) has its armature connected in series with the armature of a generator G and with commutating field winding 40 of the generator. The generator is driven by a motor M1 energized by a suitable alternating current source of supply. The generator has a field winding GF which is energized by an exciter EX through a variable resistor 41 and through reversing switches 42. The exciter, in turn, has an exciter field winding EF which is fed by direct current from the output of a rectifier 43, which rectifier is connected in series with the power coils 44 of the magnetic amplifier. The magnetic amplifier has a pair of control coils 45 and 46 wound on the central leg. Control coil 45 is connected across the commutating winding 40, whereas control coil 46 is in circuit relationship with the generator exciter EX. Rectifier 43 passes current corresponding to the current flowing through coils 45 and 46, which controls the magnetism of the magnetic amplifier and exciter voltage. The ampere turns of coil 45 must always be less than the ampere turns of coil 46.

In operation, with positive load, control coils 45 and 46 are energized in the same direction and the excitation of generator exciter field winding EF increases with the load to keep constant motor speed. More specifically, as the load increases, there will be an increase in current flow through power coils 44 which, in turn, increases the amount of current and excitation of exciter field EF.

With negative load, the motor becomes a generator and returns power to the line. Control coil 45 is reversed and opposes control coil 46 so as to reduce the generator voltage and keep constant speed of the load by returning power to the line.

Figure 11:
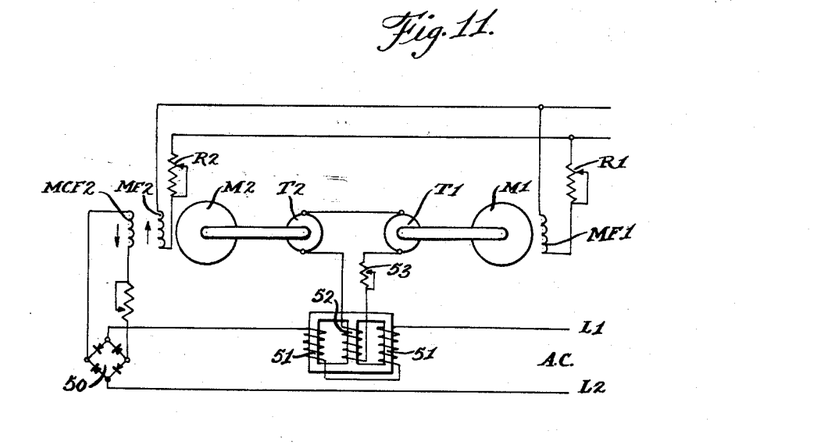
Fig. 11 shows a motor speed matching control system for flying shear control and other purposes.

Figure 11 shows a motor speed matching control system for flying shear control and other purposes. A motor M1 having a field winding MF1 and variable resistor R1 drives a tachometer generator T1. A motor M2 has an adjustable field winding MF2 which alone would operate motor M2 at less than normal speed and a control field winding MCF2 which is energized by direct current in a direction opposite to winding MF2 as indicated by the arrows and which is connected to the output of rectifier 50. The input of rectifier 50 is energized by a source of A.C. power in series with the power coils 51 of a magnetic amplifier. The control coil 52 of the magnetic amplifier is connected in series with a variable resistor 53 and two tachometer generators T1 and T2.

When motor M1 operates at less than its normal speed, the current in control coil 52 furnished by tachometer generator T1 is reduced, thereby reducing the current in power coils 51 of the magnetic amplifier and the current in field winding MCF2. This will strengthen the field of motor M2 reducing its speed to match the speed of motor M1. When motor M1 speeds up, more current will be generated by tachometer T1 and flow through control coil 52, therefore more current will flow through power coils 51 and through field winding MCF2 which will reduce the field strength of motor M2 to increase the speed of motor M2 to match that of motor M1.

Figure 12:
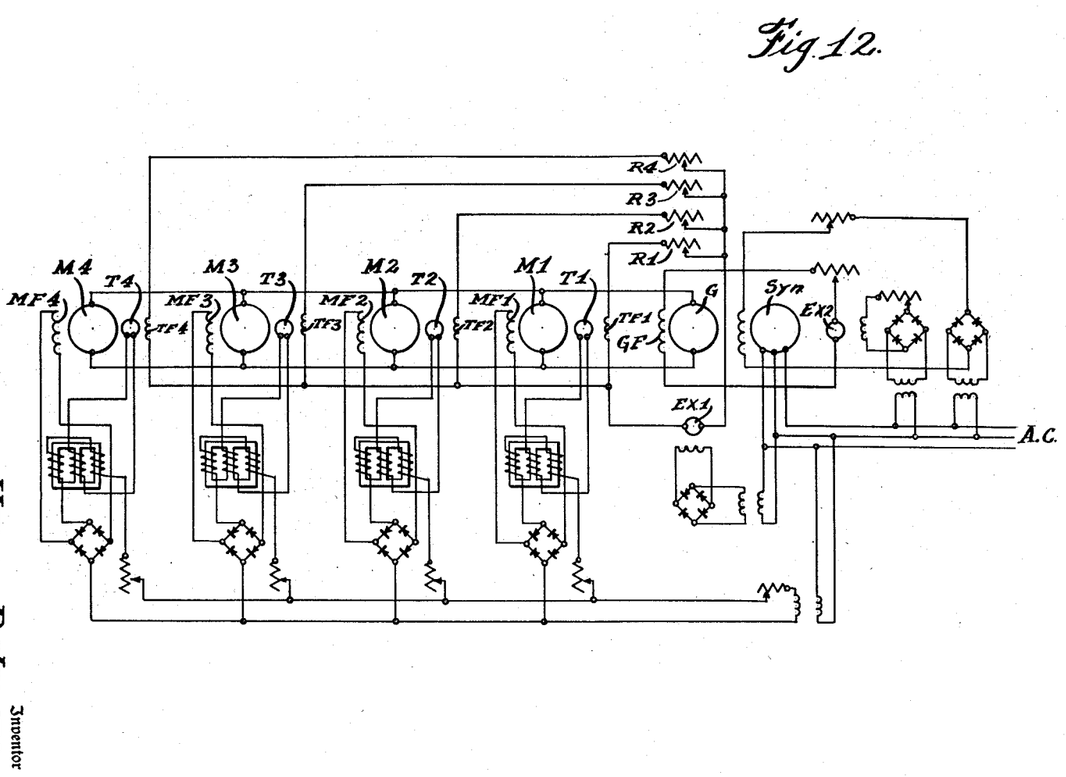
Fig. 12 shows a motor speed control system for a sectional paper machine drive or similar apparatus.

Figure 12 shows a motor speed control system for a sectional paper machine drive or similar apparatus comprising a plurality of sections, each driven by separate motors M1, M2, M3 and M4 receiving power from a common generator G of the direct current type driven by a synchronous motor Syn and having separate speed adjusting means to be described hereinafter. Exciter EX2 energizes the generator field winding GF. The speed of each section is measured by a tachometer generator such as T1, T2, T3 and T4 having adjustable field windings TF1, TF2, TF3 and TF4, respectively, each in series with an adjustable resistor, such as R1, R2, R3 and R4, and with exciter EX1. Each tachometer generator is connected to the control coil of an associated magnetic amplifier while the power coils of the particular magnetic amplifier are connected in circuit relationship with a rectifier and the field winding of the associated motor. Thus the motor field winding of each motor is responsive to any variation in voltage of its tachometer generator to restore the speed of the associated motor to normal. For example, if motor M1 speeds up so as to increase the voltage of tachometer generator T1, greater current will flow through the control and power coils of the associated magnetic amplifier and through motor field winding MF1, thereby increasing the field strength of motor M1 and reducing its speed. Of course, if motor M1 decreases in speed, its field strength will be decreased in response to the tachometer generator T to increase its speed again.

In the various current measuring circuits described above or hereinafter, a transductor may be substituted for the magnetic amplifier. A transductor is a modified magnetic amplifier having no direct current coil and wherein the direct current ampere turns are produced by a direct current bus passing through the opening in the iron core. The core is saturated by a relatively small current change.

Figure 13:
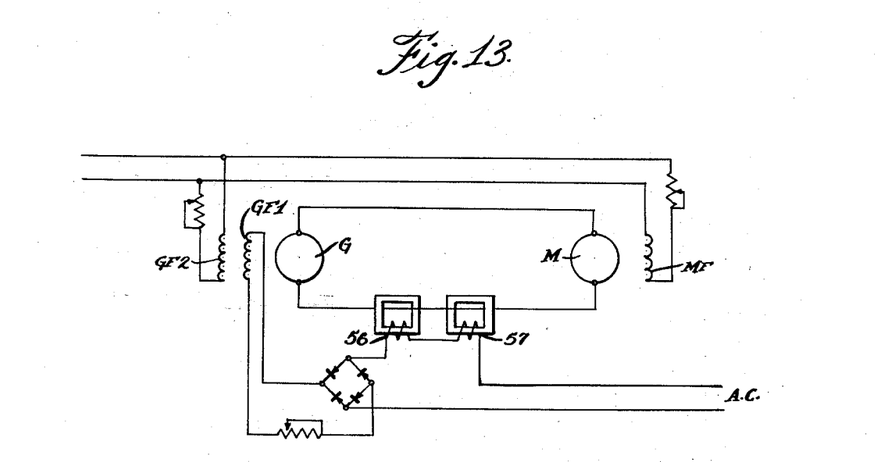
Fig. 13 shows a motor generator set with constant speed motor control similar to Fig. 5 except that a transductor is substituted for a magnetic amplifier.

Figure 13 shows a motor generator with constant current control which is substantially identical to the control system shown in Figure 5 with the exception that a transductor is substituted for the magnetic amplifier. A.C. or power coils 56 and 57 are wound on separate iron cores and are wound oppositely so that for each half cycle the A.C. ampere turns on one core aid the D.C. ampere turns while the A.C. ampere turns on the other oppose them. The coil in which the ampere turns are aiding will have no voltage induced in it because there is no change in flux due to saturation of the core. The current in the A.C. coil opposing the D.C. ampere turns will increase until the A.C. ampere turns equal the D.C. ampere turns. This induces a back voltage in the A.C. coil as the flux changes proportional to the direct current. The rectified A.C. current adjusts the motor field winding to maintain a constant current in the motor generator circuit.

Figure 14:
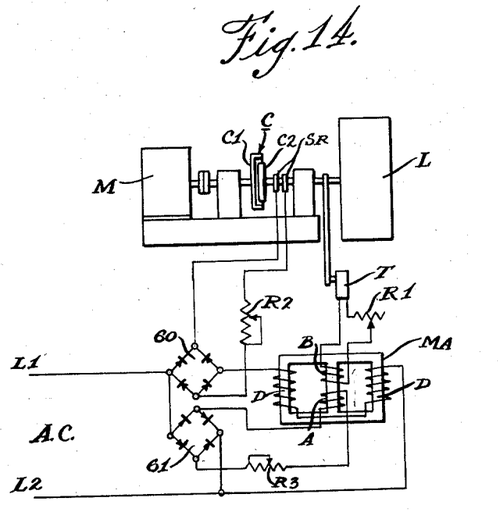
Fig. 14 shows a motor driving a fan through a magnetic clutch.

Figure 14 shows a magnetic clutch drive comprising a constant speed motor M which drives a load L such as, for example, a fan through a magnetic clutch C. This load may be positive or negative. When the load is positive, the clutch comprises a driving element C1 and a driven element C2, the latter being directly coupled to the load and having a coil inside of it which produces a magnetic flux through clutch elements C1 and C2 to drive the load. The speed of the load connected element C2 may be more or less than that of the motor connected element C1, depending upon when the load is negative or positive, and can be adjusted by changing the value of current in the coil of element C2. This coil receives power through slip rings SR from a magnetic amplifier MA which energizes the load coils of the clutch C through rectifier 60 connected to a source of A.C. potential. The control coil A of the magnetic amplifier receives energy from the rectifier 61 and a source of A.C. power as shown. The ampere turns of coil A can be adjusted by resistor R3 making coil A the reference coil. Control coil B receives power from a tachometer generator T driven from the load shaft, as shown, and which has a variable resistor R1 in series therewith. Coil B opposes coil A as shown by the arrows and provides fewer ampere turns than coil A.

When the load, such as a fan, is positive, the speed is less than normal, the coil of driven element C2 is increased in strength, and more flux passes through power coils D strengthening the clutch coil and increasing the speed of load L. When the speed of load L is positive and above normal, the coil of driven element C2 is reduced in strength, hence slows down load L. When the load is negative, such as occurs with a hoist, the excitation of the clutch is reversed to maintain the desired speed.

Figure 15:
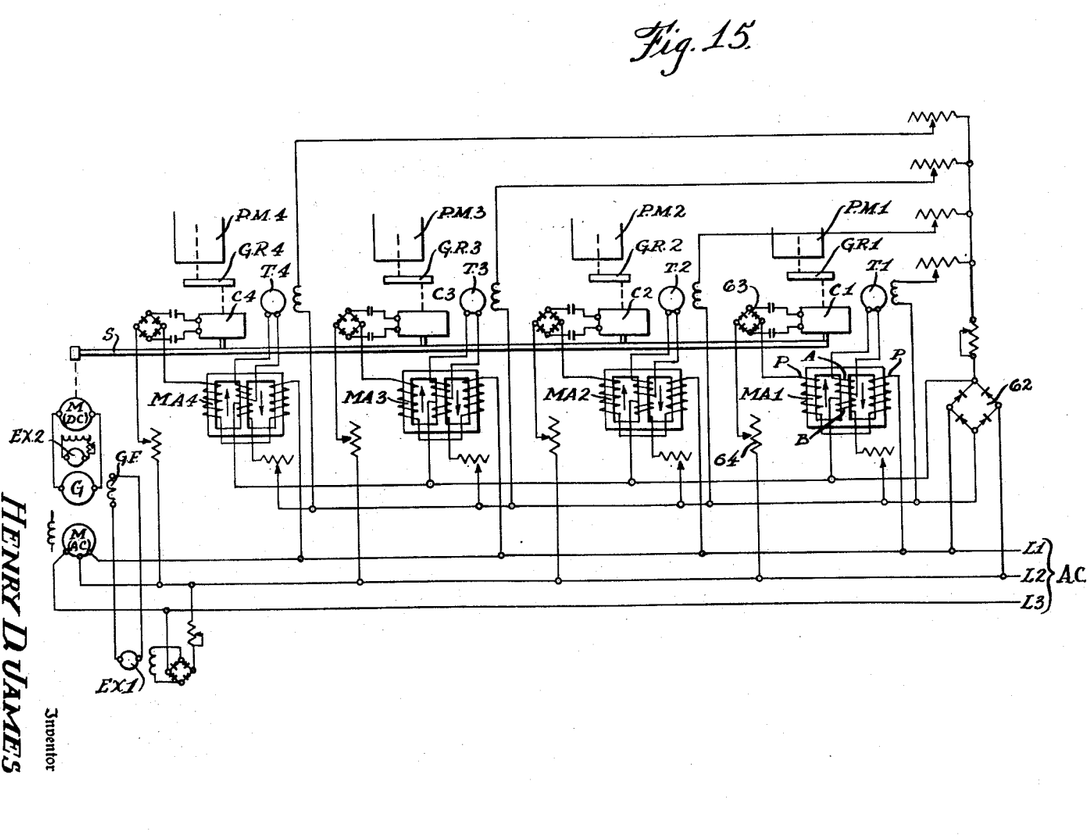
Fig. 15 shows a sectional paper machine drive having a plurality of sections driven through separate magnetic clutches.

Figure 15 shows a sectional paper machine drive having a plurality of sections, each section being driven by a separate magnetic clutch receiving power from a common jack shaft system S. An A.C. motor M (A.C.) energized by a suitable source of alternating current drives a generator G energized by a generator field winding GF receiving its current from an exciter EX1. The generator G drives an exciter EX2 and energizes a direct current motor M (D.C.) which drives the jack shaft S. As stated previously, shaft S drives a plurality of sections, four being shown for example, and each driving a section of the paper machine. Only one section will be described, it being noted that corresponding reference letters with different numerals as suffixes correspond to the same element. The common drive shaft S drives a magnetic clutch C1, which, in turn, drives gears GR1, which finally drive a paper machine section PM1. A tachometer generator T1 driven by PM1 is connected to a control coil A of a magnetic amplifier MA1 while an opposing control coil B is connected to a suitable source of potential through a rectifier 62. The remaining sections are duplicates, it being noted, for example, that magnetic clutch elements C2, C3 and C4 correspond to gears GR2, etc. The speed of each section is measured by an individual generator such as, for example, T1 connected to a control coil A of the magnetic amplifier MA. The power coils P of each magnetic amplifier controls the "slip" of the associated clutch, such as C1, through a rectifier 63 and an adjustable resistor 64. When any section such as the first section overspeeds, the generator voltage of generator T1 increases, reducing its load current and increasing the "slip" of its clutch to restore the speed to normal. A decrease in speed increases the strength of the clutch coil to restore the section to normal speed.

Figure 16:
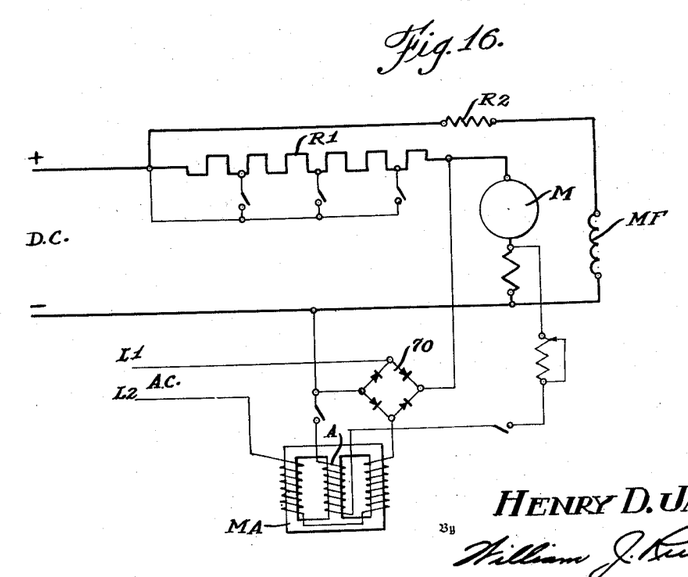
Fig. 16 shows a motor control system for operating a printing press or the like wherein the motor is driven at very slow speed.

Figure 16 shows a motor control system such as one for operating a printing press or the like wherein it is necessary to operate the motor at a very slow speed while the paper is being threaded through the press. In order to obtain this slow speed, a resistor R1 is inserted in the motor armature circuit and a second resistor (not shown) may be connected directly across or in shunt with the motor armature terminals in accordance with known systems. This shunt resistor may have means for manual regulation. But in accordance with the present invention, there is substituted for such shunt resistor a rectifier 70 and a magnetic amplifier MA whose control coil reduces the current supplied by the rectifier to the motor with decreasing load and increases the current supplied by the rectifier with increased motor load. Control coil A measures motor current. The series resistance R1 furnishes the normal current which passes through the motor armature M, also the current through the shunt resistor under previously stated conditions. With the present arrangement, the series resistor furnishes current to the motor armature but is assisted by the rectifier current.

When the load on the motor increases, it will require more current which is supplied by the rectifier 70 in shunt with the armature which will raise the voltage across the motor armature so that less current is required through the series resistor R1. When the motor load decreases below normal, the rectifier 70 furnishes less current, causing the series resistor to furnish an increased amount of current which reduces the voltage on the motor terminals in proportion to the IR drop through the motor. In other words, the rectified current adjusts the voltage across the motor terminals to compensate for the IR drop through the series resistance and the motor armature. On increasing the load, the rectifier furnishes increasing power. As the load drops off, the rectifier decreases its power in proportion to the IR drop in the motor and series resistor. The purpose of this connection is to provide a low voltage across the motor terminals regulated in proportion to the load on the motor. If the voltage is maintained at the proper value, the motor will run at its adjusted speed. In short, with constant motor current, control resistor R1 maintains the motor speed constant. With increase in load, control coil A increases the motor voltage to maintain constant speed. With decrease in load, control coil A decreases the motor voltage to maintain constant speed.

In previous devices a rectifier, supplying the entire power used by a motor, can be controlled by a magnetic amplifier to change the voltage at the motor terminals. This requires a rectifier and amplifier large enough to supply full load power to the motor. The present scheme furnishes only a part of the power required for the motor to operate at a slow speed. The larger power required by the motor is furnished by the line.

Figure 17:
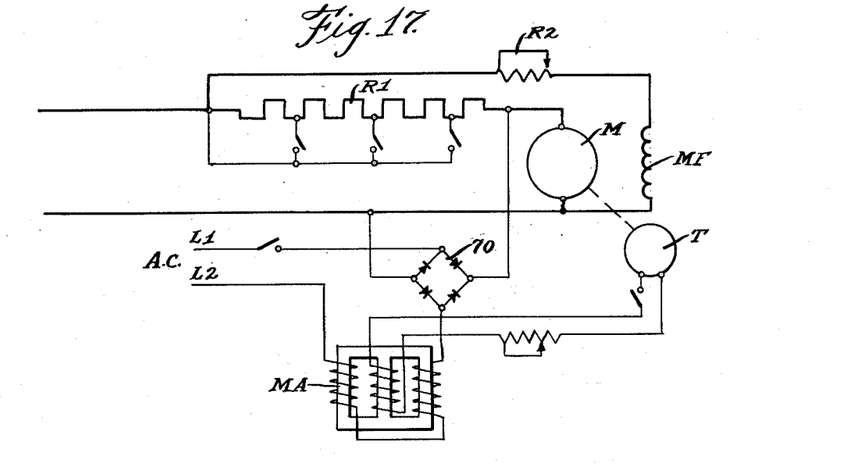
Fig. 17 shows a motor control system similar to Fig. 16.

Figure 17 shows a motor control system for regulating slow speed of a motor with a series resistor and rectifier armature shunt similar to the system shown in Figure 16. In Figure 17 the speed of motor M is maintained constant by a tachometer T driven thereby. Any deviation in speed affects control coil C to alter the voltage of rectifier 70 through the magnetic amplifier MA to restore the speed of motor M to normal.

Figure 18:
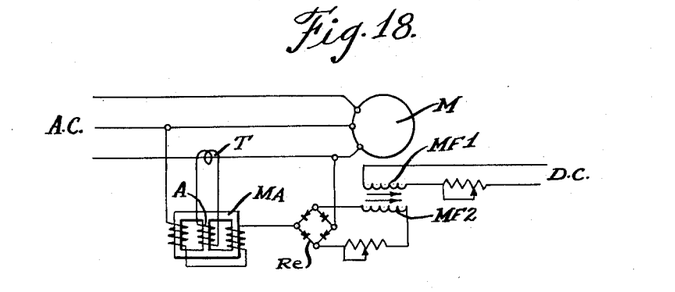
Fig. 18 shows a piercing mill control system driven by a synchronous motor.

Figure 18 shows a piercing mill control system. A synchronous motor M which drives a piercing mill (not shown) has a very heavy momentary load imposed upon it when the metal is pierced. At this time, the motor field winding is strengthened by the magnetic amplifier MA, the latter passing a heavy current through motor field winding MF2, which assists motor field winding MF1 to prevent the motor from pulling out of step. A current transformer T responds to an increase in load to send more current through the central or control coil A of the magnetic amplifier. If desired, a transformer may be interposed between the current transformer winding and the control coil A. This increase in current saturates the iron of the magnetic amplifier and causes more current to flow through the rectifier RE to motor field winding MF2 to increase the "pull out" torque of the motor.

Figure 19:
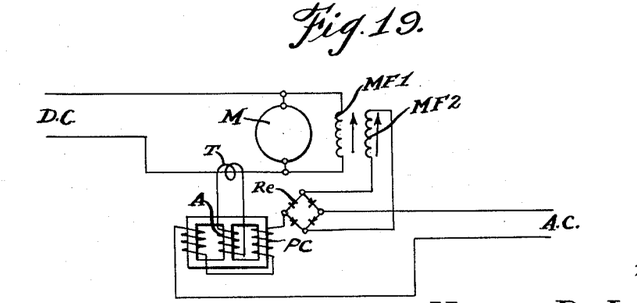
Fig. 19 shows a piercing mill control system driven by a direct current motor.

Figure 19 shows a motor control system which is very similar to Figure 18, that is, it is susceptible to withstand very high momentary peak loads, but wherein a direct current motor is used instead of a synchronous motor. The control system is for the purpose of preventing a slow down of the direct current motor under heavy momentary overload. When a high peak load occurs, the current rush will induce a current in the current transformer and through the control coil A of the magnetic amplifier which, in turn, causes greater current flow through the power winding PC of the magnetic amplifier and adds rectified current flow through motor field winding MF2 which increases the field strength of the motor to prevent it from having a serious decrease in speed.

Thus it will be seen that I have provided various control systems for regulating various characteristics of an electric motor, such as speed, load, etc., all of which control systems embody magnetic amplifiers connected in such way as to afford maximum utilization of the many desirable characteristics of such magnetic amplifiers, also, so as to make the control systems extremely simple and rugged and embodying a minimum number of parts so that the cost will be low and so that their upkeep will be within the purview of an average technician rather than requiring a highly skilled electrical technician; furthermore, I have provided control systems which are devoid of electronic tubes and moving parts, making the systems truly reliable in operation for long periods of time, thus giving the systems considerably longer life than that of commonly used systems.

While I have illustrated and described several specific embodiments of my invention, it will be understood that these are by way of illustration only, and that various changes and modifications may be made within the contemplation of my invention and within the scope of the following claims.

I claim:

1. A motor speed regulating system, comprising a motor having a shunt field winding and a control field winding in magnetic relationship therewith, a tachometer generator driven by said motor, a saturable core reactor having a control winding connected in series with said tachometer generator and having power windings connected in series with a rectifier and with said control field winding and energized by an alternating current source, said tachometer generator having a separate field winding energized by a constant potential source so as to be independent of speed variations of said motor whereby said tachometer generator is responsive to speed changes of said motor to vary in direct proportion, the excitation of said control field winding and regulate the speed of said motor.

2. A motor speed control system comprising a motor having a shunt field winding and a control field winding electromagnetically coupled thereto but having no electrical connection therewith, a tachometer generator driven by said motor, a magnetic amplifier having a control coil in circuit relationship with said generator, and having power coils electrically connected to said control field winding, a rectifier connected to said power coils and to said control field winding so as to conduct rectified current from said power coils through said control winding which is responsive to current variations of said control winding, to maintain the motor speed constant within predetermined limits.

3. A motor speed control system, comprising a motor having a main field winding and a separate auxiliary field winding having no electrical connection to said main field winding for controlling the speed of the driven load of said motor, a tachometer generator having an armature mechanically coupled to the armature of said motor for generating a voltage proportional to the speed of said driven load, and a magnetic amplifier comprising a saturable core reactor having a control winding electrically connected to said generator so as to be responsive only to the speed of said driven load as measured by said generator, said magnetic amplifier including a power winding electrically connected to said auxiliary field winding so as to vary the magnetization of said auxiliary field winding directly in response to variations in the voltage of said generator to maintain constant motor speed within predetermined limits.

4. A motor speed control system, comprising a motor, a main shunt field winding and independent auxiliary field winding magnetically associated therewith but having no electrical connection thereto for controlling the speed of the driven load of said motor, a tachometer generator having an armature mechanically coupled to the armature of said motor for generating a voltage proportional to the speed of said driven load, and a magnetic amplifier comprising a saturable core reactor having a control winding electrically connected across said tachometer generator armature so as to be responsive only to the speed of said driven load as measured by said generator, said magnetic amplifier including power windings electrically connected to said auxiliary field winding to vary the magnetization thereof in direct proportion to voltage variations of said generator for maintaining the motor speed constant within predetermined limits.

5. A motor speed control system, comprising a motor having a self-excited shunt field winding and a separate control field winding having no electrical connection thereto for controlling the speed of a driven load, a tachometer generator mechanically coupled to the armature of said motor for generating a voltage proportional to the speed of said load, and a magnetic amplifier of the saturable core reactor type having a control winding electrically connected to said tachometer generator so as to be directly responsive to the speed of said load as measured by said generator voltage, said magnetic amplifier including power windings directly connected to said control field winding so as to vary the strength of the motor field in a manner so as to maintain constant motor speed within predetermined limits.

References Cited in the file of this patent

UNITED STATES PATENTS

| | | |
|---|---|---|
| 1,426,123 | Stoekle | Aug. 15, 1922 |
| 1,428,588 | Hawkins | Sept. 12, 1922 |
| 2,482,101 | Cooper | Sept. 20, 1949 |
| 2,519,339 | Avery | Aug. 22, 1950 |
| 2,546,271 | McKenney et al. | Mar. 27, 1951 |
| 2,555,992 | Ogle | June 5, 1951 |
| 2,558,086 | Herchenroeder | June 26, 1951 |
| 2,600,308 | Lund et al. | June 10, 1952 |
| 2,622,239 | Bracutt | Dec. 16, 1952 |

FOREIGN PATENTS

| | | |
|---|---|---|
| 389,801 | Great Britain | June 18, 1931 |